Nov. 18, 1941. W. H. CARRIER Re. 21,946
METHOD FOR CONDITIONING AIR
Original Filed June 10, 1933
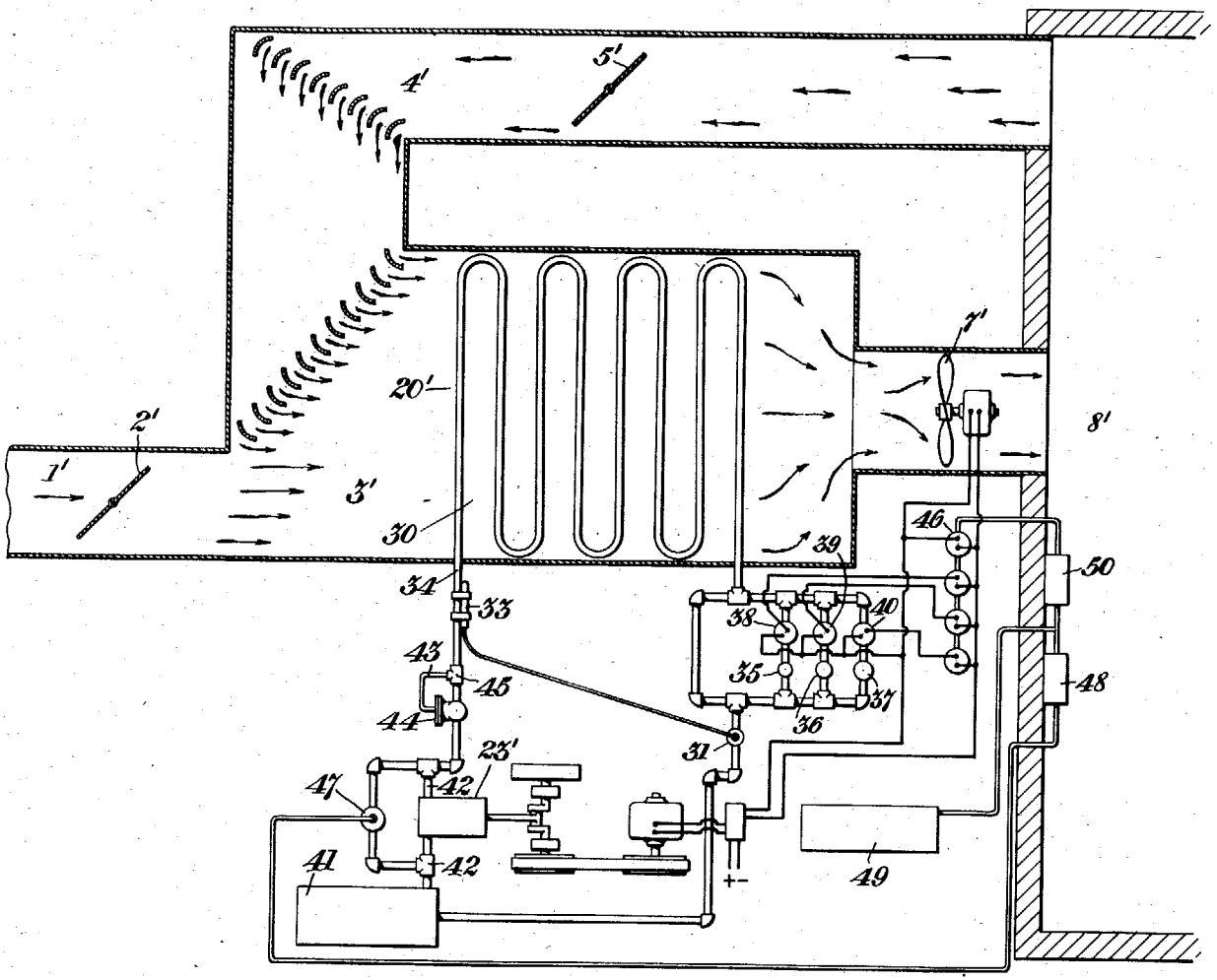
INVENTOR
Willis H. Carrier
BY C. Campbell Hunnicutt
ATTORNEY Reissued Nov. 18, 1941

Re. 21,946

UNITED STATES PATENT OFFICE 21,946

METHOD FOR CONDITIONING AIR

Willis H. Carrier, Essex Fells, N. J., assignor to Auditorium Conditioning Corporation, a corporation of New Jersey Original No. 1,956,707, dated May 1, 1934, Serial No. 675,177, June 10, 1933. Application for reissue November 26, 1935, Serial No. 51,660

2 Claims. (Cl. 62—176)

This invention relates to a method of controlling temperature and humidity under conditions of variable heat load.

Various methods have been utilized in connection with the control of humidity and temperature of air. I propose to control the humidity and temperature of air, which may comprise a mixture of fresh and return air, by passing the mixture through a chamber having a cooling surface, controlling the temperatures of the surface area of the cooling surface through which the cooling fluid circulates and controlling the temperature of the cooling fluid. The temperature of the air leaving such a device is dependent upon the character and extent of the surface, the air velocity and the temperature of the surface. Likewise, the moisture content of the leaving air depends upon the character and extent of the surface, the air velocity, and the temperature of the surface. Both the temperature and the moisture content of the air leaving such a device are subject to the entering temperature and moisture content conditions of the air. In a device of this character, it is not possible to remove moisture without also removing sensible heat of the air. The relationship between the removal of moisture and the removal of sensible heat depends substantially upon the temperature and moisture content of the entering air, and the temperature of the surface. It is possible, up to a certain point, to increase the removal of moisture in relation to the removal of sensible heat, by lowering the surface temperature. Beyond this particular point, however, the process is reversed, the amount of heat removal increasing with respect to the moisture removal, as the temperature is further lowered. Thus it will be seen that by varying the amount of contact of the air by changing the amount of effective surface and at the same time changing the refrigerant temperature it is possible to obtain any relation of temperature and dewpoint reduction desired within the known psychrometric limitations.

This invention provides a control of the temperature of the air supply to the room as well as a control of the humidity simultaneously but independently by the simultaneous and independent variation of the cooling surface area and of the temperature of the cooling medium. Both the variation of the cooling area and of the temperature of the cooling medium are controlled through independent means responsive to the temperature and humidity of the air in the room or in the return air duct. Although I provide for the variation of the proportion of fresh and return air it may be desirable in such an installation to maintain the quantity of air treated relatively constant.

One of the objects of this invention is to control the humidity and temperature of air simultaneously and independently within an enclosure by means of refrigeration under variable heat load.

Another object of the invention is to provide a method for the control of humidity and temperature by surface cooling wherein the area of the cooling surface is varied and the temperature of the cooling medium is varied independently and simultaneously as required by the conditions in the enclosure.

A still further object of the invention is to control the humidity and temperature of air by surface cooling, varying the proportion of the air contacting with the effective cooling surface whereby the temperature of the air emitted may be maintained at the desired temperature and at the same time the humidity may be varied; or the humidity may be increased and the temperature lessened.

Other objects will appear more fully hereinafter.

Referring to the drawing the figure is a diagrammatic plan view of a method of controlling humidity and temperature independently within an enclosure embodying the principles of my invention.

In carrying out my invention I propose to provide a fresh air intake through duct 1′ with damper 2′ therein leading into mixing chamber 3′. From the enclosure 8′ the return or recirculated air is brought through duct 4′ leading into mixing chamber 3′. A damper 5′ is in duct 4′. The mixed airs are drawn from mixing chamber 3′ through the conditioner 20′ by fan 7′ which in turn delivers the conditioned airs into enclosure 8′. The coils 30 may be a series of coils, plates or the like or a single extended coil.

I have provided a series arrangement in which the refrigerant is expanded in on the side of the coil over which the conditioned air leaves the conditioner and the suction side of the coil is at the front of the conditioner or the intake side and I provide also means to vary the supply of refrigerant. A master expansion valve 31 prevents flooding of the coil 30, 32, and is controlled by a thermostatic element 33 which latter is affected by the superheat in the return line 34. Valve 31 would be set to give a superheat from five to ten degrees above the normal evaporating temperature and is so designed and constructed that it gives the necessary degree of superheat regardless of the pressure in the coil. It should be noted that the coldest gas is in contact with the leaving air and the warmest gas which is superheated is in contact with the warmer entering air. That is, there is a countercurrent flow to prevent the conditioned air from again picking up moisture.

This arrangement does not of itself give control of temperature and humidity. I propose to do this by varying the refrigerant temperature or the amount of surface which is exposed. I propose to vary the amount of effective or contact surface by independently controlling the supply of refrigerant passing through the master valve 31. This may be done in a variety of ways but I have shown a series of expansion orifices 35, 36, 37, which are each provided with valves 38, 39, 40. These valves may be operated by compressed air or electrically operated solenoid valves as shown. The suction line 34 is connected to a compressor 23' having normally a constant displacement and discharging into a condenser 41 through pipe 42. Pipes 34 and 42 are connected by a pipe 43 with throttling valve 44 and connection 45. This valve may be set to maintain a minimum suction temperature of say twenty-five degrees. The valve is similar to a steam regulating pressure valve. This will prevent objectionable frosting on the coil under any conditions of operation particularly as the compressor is of the positive type, either piston or rotary, and will displace a constant volume during operation. The refrigerant handled through the coil will vary in temperature from a possible maximum of 50° to 25° for which throttling valve 44 is set. The gradation of temperature is accomplished by admitting greater or lesser amounts of refrigerant through the orifices 35, 36 and 37, by opening or closing either automatically as shown, or by hand valves 38, 39 and 40. These valves may be connected to a step thermostat 50 so that they may be closed off in succession making it possible to vary the refrigerating effect as desired. Thermostat 50 operates the step control 46 for the valves by air pressure, that is, as the pressure exceeds predetermined amounts the electric circuits for the predetermined valve are closed thereby operating the valve, each valve being operated in succession during the increase in pressure at the predetermined pressures, the reverse taking place as the pressure falls. For instance, valve 40 being closed, only 75% of the refrigerant will pass through the orifices. The closing of valves 40 and 39 will permit but 50% and the closing of all the valves will permit but 25%. A further reduction below 25% will shut down the apparatus. By interposing an additional by-pass valve 47 it is possible to control the back pressure and therefore the temperature of the refrigerant in the coil. Valve 47 may be manually operated or by hygrostat 48. By this independent but simultaneously acting control it is possible to control either manually or automatically both the amount of refrigerant and the temperature of the refrigerant within the coil. It should be noted that by this method of control the amount of effective surface of the cooling coil is also varied. The pressure air for the thermostat 50 and hygrostat 48 for operating the valves is from tank 49.

Certain modifications might be made and still fall within the scope of my invention. A single expansion valve of variable opening might be made to accomplish the same result through graduated action as is accomplished by the valves 38, 39 and 40, more than one compressor might be used, a series of cooling surfaces might be used and in such case with more than one compressor an intermittent operation of the compressors themselves may be employed in place of valve 47 for the control of pressure and temperature within the cooling coil or a speed control of the motor driving the compressor may be used in place of valve 47 when a single compressor is employed. Such modifications in no way affect the principle of the invention which is to control the amount of refrigerant and to produce a variation in effective surface contact as well as effective surface temperature independently.

Having described my invention, what I claim as new and desire to secure by Letters Patent is:

1. A method for controlling temperature and humidity of air which comprises directing the air through a chamber, admitting refrigerant to a path in said chamber adjacent the point where the air leaves said chamber, initiating evaporation of said refrigerant near said point, directing the refrigerant through said path and withdrawing the same from said path adjacent to the point where air is admitted to said chamber, controlling the superheat on the suction side of said path, controlling the quantity of refrigerant admitted to the said path, controlling the minimum suction temperature and controlling the back pressure to predetermine the temperature of the refrigerant to control the relative humidity of the air being conditioned.

2. A method of producing desired conditions of temperature and humidity in the atmosphere of an enclosure, said method consisting of moving refrigerant through a circuit including a single passage, evaporating the refrigerant in said passage by circulating air for the enclosure in heat exchange with the refrigerant in the passage, liquefying the refrigerant in a portion of said circuit, reducing the pressure of the refrigerant subsequent to liquefaction, supplying the refrigerant subsequent to said pressure reduction to the inlet of said passage, controlling said supplying by directing the refrigerant through one or more of a plurality of parallel paths feeding to said inlet, said controlling being effected by opening and closing said paths successively to the flow of refrigerant therethrough responsive to successive changes in temperature of the air within the enclosure, whereby different portions of the passage will successively become respectively effective or ineffective for the dehumidification of air circulated in contact therewith.

WILLIS H. CARRIER.